(12) United States Patent
Warth et al.

(10) Patent No.: US 12,697,572 B2
(45) Date of Patent: Aug. 4, 2026

(54) FLOW GRID AND AMBIENT AIR PURIFICATION DEVICE

(71) Applicant: MANN+HUMMEL LIFE SCIENCES & ENVIRONMENT HOLDING SINGAPORE PTE. LTD., Singapore (SG)

(72) Inventors: Tobias Warth, Winnenden (DE); Jens Gusek, Freudental (DE); Abhilash Revanna, Nanjangud (IN); Santosh Kalyanasundaram, Hosur (IN)

(73) Assignee: MANN+HUMMEL Life Sciences & Environment Holding Singapore Pte. Ltd., Singapore (SG)

( * ) Notice: Subject to any disclaimer, the term of this patent is extended or adjusted under 35 U.S.C. 154(b) by 607 days.

(21) Appl. No.: 18/186,367

(22) Filed: Mar. 20, 2023

(65) Prior Publication Data

US 2023/0294029 A1 Sep. 21, 2023

(30) Foreign Application Priority Data

Mar. 18, 2022 (IN) .............................. 202241014972

(51) Int. Cl.
*B01D 46/00* (2022.01)
*B01D 46/121* (2022.01)
(Continued)

(52) U.S. Cl.
CPC ....... *B01D 46/0049* (2013.01); *B01D 46/121* (2022.01); *B01D 46/521* (2013.01); *B01D 46/0002* (2013.01); *B01D 46/0039* (2013.01);

*B01D 46/0041* (2013.01); *B01D 46/0045* (2013.01); *B01D 2273/30* (2013.01); *F04D 19/002* (2013.01); *F04D 29/667* (2013.01);
(Continued)

(58) Field of Classification Search
None
See application file for complete search history.

(56) References Cited

U.S. PATENT DOCUMENTS

| | | | |
|---|---|---|---|
| 10,760,593 B2 | 9/2020 | Strehle et al. | |
| 2020/0116165 A1* | 4/2020 | Loercher | F04D 29/542 |

(Continued)

FOREIGN PATENT DOCUMENTS

| | | | |
|---|---|---|---|
| DE | 102017119213 A1 | 2/2019 | |
| WO | 2015124237 A1 | 8/2015 | |

*Primary Examiner* — In Suk C Bullock

(57) ABSTRACT

The present invention provides a flow grid arranged at a fluid intake side of a fluid flow generating device, the flow grid comprising: a frame configured to be mounted to a housing of the fluid flow generating device; and a fluid flow area connected to the frame, the fluid flow area having an outer perimeter, the outer perimeter having a diameter $(d_{outer})$, the outer perimeter being adjacent to the frame, wherein the fluid flow area comprises a polygonal cell arrangement having a kaleidoscopic pattern, wherein the polygonal cell arrangement comprises at least two types of cell geometries sharing a concentric axis, each type of cell geometry being arranged concentrically to the other(s), and wherein the polygonal cell arrangement is convex when viewed from the fluid intake side. There is also provided an ambient air purification device and use of the disclosed flow grid in the ambient air purification device.

16 Claims, 3 Drawing Sheets

(51) Int. Cl.
|  |  |
|---|---|
| *B01D 46/52* | (2006.01) |
| *F04D 19/00* | (2006.01) |
| *F04D 29/66* | (2006.01) |
| *F04D 29/68* | (2006.01) |
| *F24F 13/08* | (2006.01) |

(52) U.S. Cl.
CPC ........ *F04D 29/681* (2013.01); *F05D 2250/51* (2013.01); *F24F 2013/088* (2013.01)

(56) References Cited

U.S. PATENT DOCUMENTS

| | | |
|---|---|---|
| 2021/0164495 A1 | 6/2021 | Loercher et al. |
| 2021/0246909 A1* | 8/2021 | Kim ..................... F04D 29/522 |

* cited by examiner

FLOW GRID AND AMBIENT AIR PURIFICATION DEVICE

CROSS-REFERENCE TO RELATED APPLICATION

This application claims the benefit under 35 U.S.C. 119(a) of Indian Application No. 202241014972 filed on Mar. 18, 2022, in the Indian Patent Office, the entire disclosure of which is incorporated herein by reference for all purposes

TECHNICAL FIELD

The invention relates to a flow grid arranged at a fluid intake side of a fluid flow generating device, an ambient air purification device and a method of using the disclosed flow grid in the ambient air purification device.

BACKGROUND ART

Fluid flow generating devices, such as impellers or fans, are typically housed in a housing to protect the rotating devices from damage as well as to protect others from the rotating devices. In order to transmit the flow of fluid, the housing usually comprises fluid inlet(s) and fluid outlet(s), which may also have protective functions. Fluid flow generating devices are known to generate noise, causes of which are, for example, flow turbulence and blade pass frequency. Hence, housings have been developed in order to improve acoustics. For example, flow rectifiers and flow guiding devices have been used to smoothen the flow, thereby reducing the noise generated.

Acoustic and flow issues of fans used in air purifiers may also be due to air filters that are arranged in the path of air flow. These air filters may need to be installed close to the fan in order to minimize the overall size of the air purifier, which may create negative effects such as flow resistance, negative filter loading behaviour and unfavourable acoustics.

There is therefore a need to provide an improved and/or alternative solution to overcome, or at least ameliorate, the problem(s) described above and other disadvantages.

SUMMARY

In an aspect, there is provided a flow grid arranged at a fluid intake side of a fluid flow generating device, the flow grid comprising: a frame configured to be mounted to a housing of the fluid flow generating device; and a fluid flow area connected to the frame, the fluid flow area having an outer perimeter, the outer perimeter having a diameter ($d_{outer}$), the outer perimeter being adjacent to the frame, wherein the fluid flow area comprises a polygonal cell arrangement having a kaleidoscopic pattern, wherein the polygonal cell arrangement comprises at least two types of cell geometries sharing a concentric axis, each type of cell geometry being arranged concentrically to the other(s), and wherein the polygonal cell arrangement is convex when viewed from the fluid intake side.

Advantageously, fluid taken in through the disclosed fluid flow area and into the fluid flow generating device may have lowered flow resistance, as compared to known flow grids or flow guiding devices. Thus, the disclosed flow grid may provide better acoustics or may generate lower noise than known flow grids or flow guiding devices. Specifically, the disclosed polygonal cell arrangement and/or the convexity of the polygonal cell arrangement aid in streamlining or smoothening the fluid flow path. Further advantageously, the disclosed flow grid may protect the fluid flow generating device from damage, or conversely, may protect users from access to the fluid flow generating device while in operation.

In another aspect, there is provided an ambient air purification device comprising: a housing having at least one air inlet and at least one air outlet; a fluid flow generating device housed in the housing; the flow grid disclosed herein, arranged at the fluid intake side of the fluid flow generating device, wherein the frame of the flow grid is mounted to the housing; and at least one filter element arranged at a fluid intake side of the flow grid, such that an air flow generated by the fluid flow generating device enters from the air inlet(s), goes through the filter element, the flow grid and the fluid flow generating device in sequence, and exits via the air outlet(s).

Where filter element(s) are included in systems involving a fluid flow generating device, such as in ambient air purification devices or air heaters or coolers, it may be desirable to place the filter element as close as possible to the fluid flow generating device in order to minimize the overall size of the system, which may create negative effects as mentioned above. As the fluid flow generating device tends to generate a significant proportion of the noise at the fluid intake side, the disclosed flow grid advantageously aids to improve the air flow resistance created by filter element(s) arranged at a fluid intake side of the fluid flow generating device, by smoothening and guiding the flow of air exiting the filter element(s), before the air flow enters the fluid flow generating device. The disclosed flow grid further advantageously guides the air flow, such that the filter element(s) may be loaded with dust or other particles more evenly across the filter surface.

In yet another aspect, there is provided a use of the flow grid as disclosed herein in an ambient air purification device.

BRIEF DESCRIPTION OF DRAWINGS

In the figures, like numerals denote like parts.

DETAILED DESCRIPTION

Figures 1, 2:
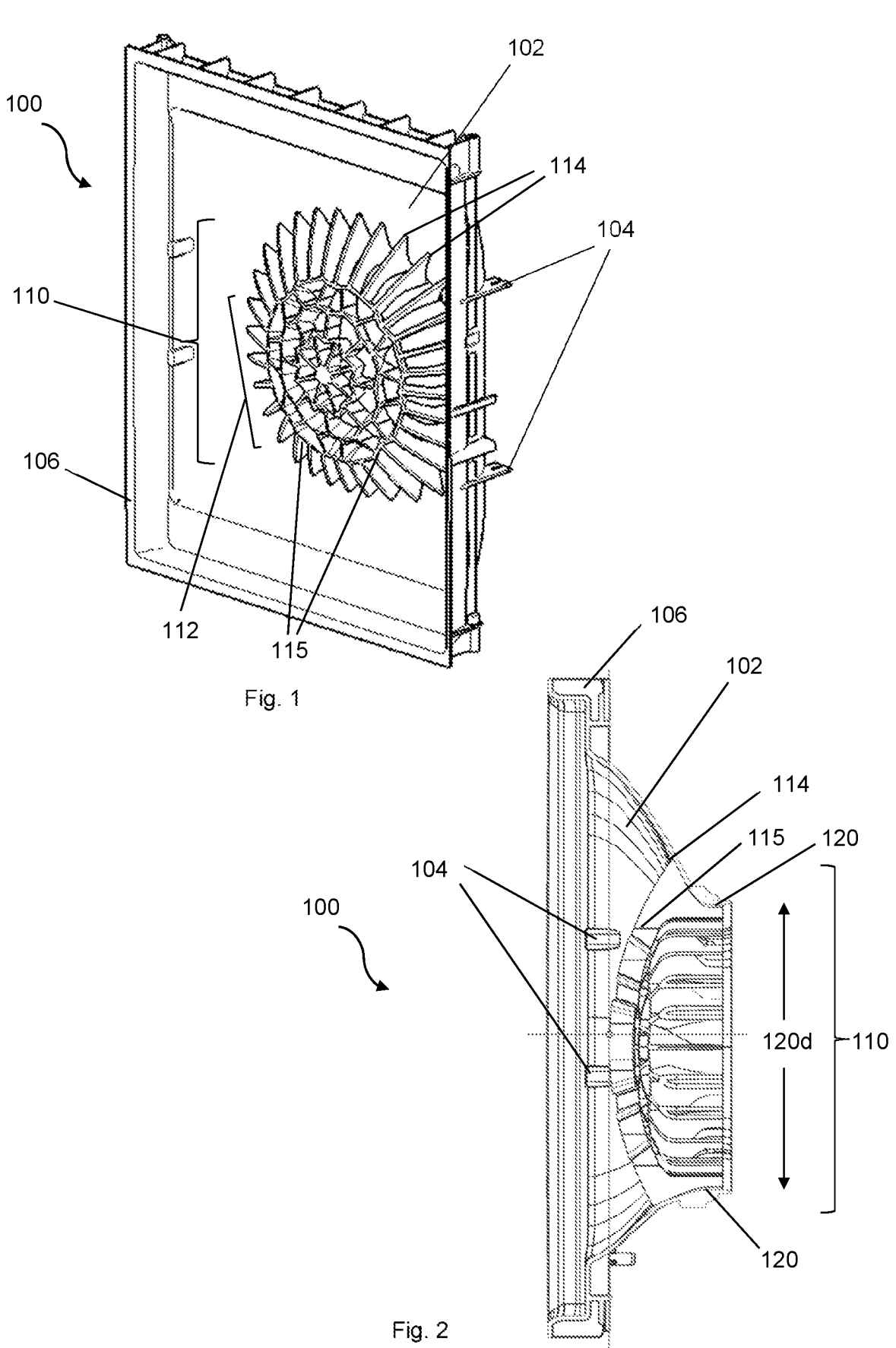
FIG. 1 shows an illustration of a perspective view of flow grid 100 according to an embodiment of the present disclosure.
FIG. 2 shows an illustration of a side view of the flow grid 100.

Hereinafter, exemplary embodiments of the present invention will be described in detail with reference to the accompanying drawings. The detailed description of this invention will be provided for the purpose of explaining the principles of the invention and its practical application, thereby enabling a person skilled in the art to understand the invention for various exemplary embodiments and with various modifications as are suited to the particular use contemplated. The detailed description is not intended to be exhaustive or to limit the invention to the precise embodiments disclosed. Modifications and equivalents will be apparent to practitioners skilled in this art and are encompassed within the spirit and scope of the appended claims.

In some embodiments, there is provided a flow grid arranged at a fluid intake side of a fluid flow generating device. The fluid flow generating device may be an impeller or a fan, such as a radial fan or an axial fan.

The flow grid comprises a frame configured to be mounted to a housing of the fluid flow generating device. The flow grid comprises a fluid flow area connected to the frame. The fluid flow area has an outer perimeter, which has a diameter ($d_{outer}$). The outer perimeter of the fluid flow area is adjacent to the frame.

The frame may provide a means to secure the fluid flow area in place in front of the fluid flow generating device, that is, at the fluid intake side of the fluid flow generating device. The frame may simply surround or border the fluid flow area. Alternatively, the frame may aid in creating an optimal path for fluid flow into the fluid flow area. The frame may be configured to create a channel to guide the inflow of fluid into the fluid flow area. For example, the frame may be curved or bowl-shaped such that the fluid may be guided along the curve to the base of the curve or bowl where the fluid flow area is located. The frame may have any other shape, such as a rectangular shape, such that the fluid may be guided to where the fluid flow area is located. The frame may be or may comprise a fluid inlet duct to channel the inflow of fluid into the fluid flow area and towards the fluid flow generating device. Alternatively, the housing of the fluid flow generating device may aid to channel the inflow of fluid into the flow grid and towards the fluid flow generating device. In such embodiment, the frame may be configured to be mounted to such part of the housing of the fluid flow generating device, such as a fluid inlet duct of the housing of the fluid flow generating device. The frame and/or the fluid inlet duct may be made of any suitable material, such as metal, e.g., sheet metal, plastic or injection-molded plastic. Examples of suitable material include thermoplastic polymers, such as, but not limited to, acrylonitrile butadiene styrene, polyamide, polypropylene, and variations of thermoplastic polymers, such as a polypropylene talcum mix.

The fluid flow area may be positioned in the path of fluid flow generated by the fluid flow generating device. The fluid flow area may be positioned in the fluid flow path, so that all or substantially all or most of the fluid flow generated by the fluid flow generating device goes through the fluid flow area. The centre of the fluid flow area may be positioned in the centre of the fluid flow path. The fluid flow area and the fluid flow generating device may be arranged to share a concentric axis, so that the centre of the fluid flow area can be positioned at the centre of the fluid flow path.

The flow grid may further comprise a nozzle extending from the frame and towards the fluid flow generating device. The nozzle may be sized to correspond to the fluid flow generating device. The nozzle may be sized such that blades of the fluid flow generating device may rotate around the nozzle. The nozzle may aid in channelling the fluid flow going through the fluid flow area to the fluid flow generating device. The nozzle may be the base of the channel created by the frame that guides the inflow of fluid from the fluid flow area into the fluid flow generating device. The nozzle may funnel the inflow of fluid into the fluid flow generating device. Thus, the nozzle may be known as an inlet nozzle to the fluid flow generating device. Where the flow grid comprises the nozzle, the fluid flow area may be fitted within the frame and the nozzle. In such embodiments, the fluid flow area and the fluid flow generating device, and therefore also the nozzle, may be arranged to share a concentric axis, so that the centre of the fluid flow area can be positioned at the centre of the fluid flow path. The nozzle may be made of any suitable material, such as metal, plastic or injection-molded plastic, such as those disclosed herein.

In order for the fluid flow area to allow fluid to pass therethrough, the fluid flow area comprises or may be made up of cells or through-holes or channels. These cells, through-holes or channels, or at least a part of these cells, through-holes or channels, may form the polygonal cell arrangement. These cells, through-holes or channels may be formed by bars, which surround the cells, through-holes or channels. The fluid flow area, or specifically the bars, may be made of any suitable material, such as plastic or injection-molded plastic, such as those disclosed herein.

The frame, the fluid flow area, the nozzle (where present) and the fluid inlet duct (where present) may be integrally formed. The frame, the fluid flow area, the nozzle (where present) and the fluid inlet duct (where present) may be formed of the same material, such as plastic or injection-molded plastic, such as those disclosed herein. Alternatively, the frame, the nozzle (where present) and the fluid inlet duct may be integrally formed or formed of the same material, such as metal or plastic, while the fluid flow area may be formed of plastic or injection-molded plastic.

The polygonal cell arrangement is convex when viewed from the fluid intake side. That is, the face of the polygonal cell arrangement may be curved, with the inflexion point of the curve pointing towards the fluid intake side. The convex curve of the polygonal cell arrangement may have a base, which is opposite the inflexion point. The base of the curve may be concentric to the inflexion point of the curve. The base of the convex curve of the polygonal cell arrangement may be adjacent to or connected to the rest of the fluid flow area. The polygonal cell arrangement and the rest of the fluid flow area may be made of the same material. The polygonal cell arrangement and the rest of the fluid flow area may be integrally formed. The circumference of the base of the convex curve of the polygonal cell arrangement may be adjacent to or connected to the rest of the fluid flow area. The rest of the fluid flow area may have a profile different or similar to the curved polygonal cell arrangement. The rest of the fluid flow area may have a flat profile, that is, the fluid flow direction is perpendicular to the plane of the cells, through-holes or channels forming this part of the fluid flow area. The rest of the fluid flow area may be convex when viewed from the fluid intake side, with a different convexity to the polygonal cell arrangement. The rest of the fluid flow area may have a profile that is parallel to the fluid flow direction, that is, the fluid flow direction may be parallel to the plane of the cells, through-holes or channels forming this part of the fluid flow area.

In other embodiments, the fluid flow area may be convex when viewed from the fluid intake side. That is, the whole fluid flow area, including the polygonal cell arrangement, may be convex when viewed from the fluid intake side. In such embodiments, the base of the convex curve of the fluid flow area may be adjacent to or connected to the frame, the circumference of the base of the convex curve of the fluid flow area being the outer perimeter.

The convexity of the polygonal cell arrangement or the fluid flow area refers to the curvature or how curved the polygonal cell arrangement or the fluid flow area is. The convexity may be measured by the perpendicular distance from the inflexion point of the convex curve to the base of the convex curve. The inflexion point of the convex curve may share a concentric axis with the base of the convex curve. Thus, the perpendicular distance from the inflexion point of the convex curve to the base of the convex curve may also be the axial distance from the inflexion point, or specifically the tip of the inflexion point, to the base of the convex curve. In embodiments where the polygonal cell arrangement is convex, the base of the convex curve may be the base of the curved polygonal cell arrangement. In some embodiments, the base of the convex curve may be the outer perimeter of the fluid flow area adjacent to or connected to the frame, regardless of the profile of the rest of the fluid flow area, since fluid can flow through the whole fluid flow area and the intersection of the frame and the fluid flow area marks the boundary of the fluid flow. In embodiments where the fluid flow area is convex, the base of the convex curve may be the base of the curved fluid flow area, which is the outer perimeter or circumference of the fluid flow area that is adjacent to or connected to the frame. The larger the perpendicular distance or axial distance, the more convex or more curved is the curve.

It may be advantageous for the polygonal cell arrangement or the fluid flow area to be convex for favourable or reduced flow resistance. On the other hand, the more convex is the curve, the larger the space needed for the flow grid or the ambient air purification device comprising the flow grid. It has been determined that a suitable or allowable convexity may be based on the volume of fluid exiting the flow grid and entering the fluid flow generating device, since a larger fluid volume means that a larger fluid flow generating device is used and therefore a system with a larger size is feasible. Hence, advantageously, an allowable or suitable convexity may be measured by the ratio of the diameter of the fluid flow area ($d_{outer}$) or the diameter of the nozzle (where present), which determines the volume of fluid exiting the flow grid and entering the fluid flow generating device, to the axial distance between the tip of the inflexion point of the convex curve and the base of the convex curve, wherein the inflexion point of the convex curve shares the concentric axis with the base of the convex curve. In embodiments where the base of the convex curve is the outer perimeter of the fluid flow area, the axial distance is between the tip of the inflexion point of the convex curve and the outer perimeter of the fluid flow area, wherein the inflexion point shares the concentric axis with the outer perimeter of the fluid flow area. The ratio may be at least 1.5, or more than 1.5, or at least 1.6, or more than 1.6, or at least 1.7, or more than 1.7, or at least 1.8, or more than 1.8, or at least 1.9, or more than 1.9, or at least 2, or more than 2.

The fluid flow area comprises a polygonal cell arrangement having a kaleidoscopic pattern. The polygonal cell arrangement comprises at least two types of cell geometries sharing a concentric axis, each type of cell geometry being arranged concentrically to the other(s). The arrangement of the at least two types of cell geometries may form the kaleidoscopic pattern. It has been discovered that such a polygonal cell arrangement channels the flow of fluid in an optimized manner, to thereby improve the fluid flow path exiting the fluid flow area as compared to that entering the fluid flow area.

A kaleidoscopic pattern refers to patterns that result from the reflection of one or more reflecting mirrors. Thus, the arrangement of the at least two types of cell geometries are symmetrical along these one or more mirror lines. As the at least two types of cell geometries share a concentric axis, the one or more mirror lines intersect the concentric axis. Each type of cell geometry may have any geometrical shape. Each type of cell geometry may have one or more non-rounded geometrical shapes. Within a type of cell geometry, there may be one or more geometrical shapes, as long as the type of cell geometry is eventually kaleidoscopic.

Figures 3A, 3B, 3C:
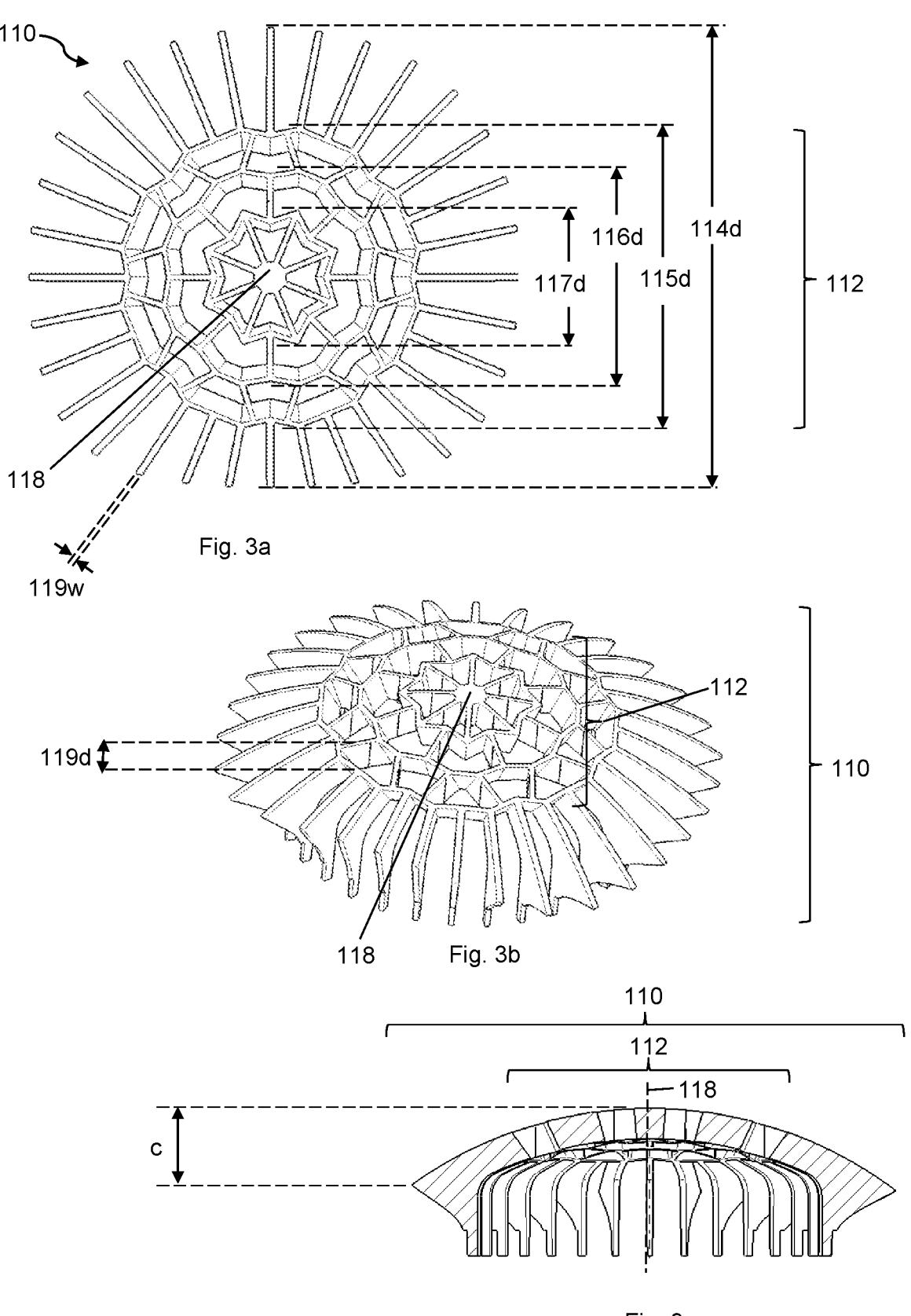
FIG. 3a shows an illustration of a top view of fluid flow area 110 according to an embodiment of the present disclosure.
FIG. 3b shows an illustration of a perspective view of the fluid flow area 110.
FIG. 3c shows an illustration of a side view of the fluid flow area 110.

The polygonal cell arrangement may extend to the outer perimeter of the fluid flow area. Thus, the polygonal cell arrangement may be arranged within the outer perimeter, wherein the fluid flow area comprises an arbitrary second perimeter having a second diameter smaller than $d_{outer}$, and wherein a first type of cell geometry extends between the outer perimeter and the second perimeter. The second perimeter may be an arbitrary perimeter to denote one of the perimeter limits of the first type of cell geometry. In such embodiments, the whole fluid flow area is convex. Alternatively, the polygonal cell arrangement may be a part of the fluid flow area, which is defined by an arbitrary first perimeter, that surrounds or encircles the polygonal cell arrangement, which has a diameter (the "first diameter") that is smaller than $d_{outer}$. The first perimeter may be arranged concentrically to the outer perimeter. The first perimeter may be an arbitrary perimeter to denote one of the perimeter limits of the first type of cell geometry, if the polygonal cell arrangement does not extend to the outer perimeter. Thus, the fluid flow area may comprise a first perimeter having a first diameter smaller than $d_{outer}$ and an arbitrary second perimeter having a second diameter smaller than the first diameter, the polygonal cell arrangement being arranged within the first perimeter, and wherein a first type of cell geometry extends between the first perimeter and the second perimeter. The first type of cell geometry may have any geometrical shape(s). Where the first type of cell geometry has more than one geometrical shape, the shapes may be repeated. For example, the first type of cell geometry may include repeated units of an indented quadrilateral shape or a quadrilateral with an indented base and a quadrilateral with at least one or some soft edges, that is, edges with sides or curves, such as is shown in FIG. 3a.

The second type of cell geometry may then extend from the second perimeter to an arbitrary third parameter having a diameter (the "third diameter") smaller than the second diameter. The third type of cell geometry may extend from the third perimeter to an arbitrary fourth parameter having a fourth diameter smaller than the third diameter, and so on. Thus, the fluid flow area may comprise a third perimeter, a fourth perimeter, . . . , and an nth perimeter, each third, fourth, . . . , and nth perimeter having a diameter sequentially smaller than the previous perimeter, wherein a second type of cell geometry extends between the second perimeter and the third perimeter, a third type of cell geometry extends between the third perimeter and the fourth perimeter, . . . , and an nth type of cell geometry extends between the nth perimeter and the shared concentric axis. The nth perimeter may be an arbitrary perimeter to denote a perimeter limit of the nth type of cell geometry which extends from the nth perimeter to the shared concentric axis. Each type of cell geometry may have any geometrical shape(s), which may be repeated. For example, the third and final type of cell geometry as shown in FIG. 3a has one geometrical shape of an indented triangle or a triangle with an indented base, in which the tip of the triangle meets at the concentric axis shared between all the types of cell geometries.

The first diameter, second diameter, . . . , and/or nth diameter may be selected as desired. The diameters selected may be suitable for production of the flow grid, which may involve an injection molding process.

Each polygonal cell of the polygonal cell arrangement may be a cell, through-hole or channel as disclosed above. Thus, each polygonal cell may be formed by bars surrounding or bounding it, as disclosed above. The boundary of each polygonal cell or the bars forming the boundary may have a thickness or width suitable to withstand the flow of fluid generated by the fluid flow generating device. The thickness or width of the bars may be selected suitably to create cells, through-holes or channels that minimize pressure loss of fluid flowing through these cells, through-holes or channels. In an example, a suitable bar thickness may range from 0.5 mm to 3 mm, or from 0.7 mm to 3 mm, or from 1 mm to 3 mm, or from 1.2 mm to 3 mm, or from 1.5 mm to 3 mm, or from 0.5 mm to 2.7 mm, or from 0.5 mm to 2.5 mm, or from 0.5 mm to 2.3 mm, or from 1 mm to 2.7 mm, or from 1.5 mm to 2.7 mm, or from 1.5 mm to 2.5 mm. In an embodiment, the bar thickness may be 2 mm. Each polygonal cell may have a diameter, extending from a boundary of the cell to an opposite boundary or bar. The diameter of each polygonal cell may be selected according to safety standards for machinery, such as DIN EN ISO 13857:2019. For example, for a certain distance between a hazard zone, like the fluid flow generating device, and an opening to the hazard zone, the narrowest dimension or diameter of such opening, which is each polygonal cell in this case, should have a maximum limit. In an example, the diameter of the narrowest dimension of each polygonal cell may be in the range of from 6 to 25 mm, to protect a user, such as a finger of a user, from the fluid flow generating device.

The polygonal cell arrangement or the fluid flow area may have a face from which the kaleidoscopic pattern can be seen, and which may be curved. The polygonal cell arrangement or the fluid flow area may have a depth, which is in a direction perpendicular to the plane of the face. In terms of fluid flow, the depth of the polygonal cell arrangement or the fluid flow area is the distance through which the fluid flows through the polygonal cell arrangement or fluid flow area, since the fluid flows in a direction perpendicular to the face. The depth of the polygonal cell arrangement may be determined by the depth of the bars. A suitable depth may be selected to ensure the flow of fluid out of the polygonal cell arrangement or fluid flow area is smoothened and is channeled into the fluid flow generating device. The dimensions of the bars, i.e., the width and depth of the bars, may be dependent on each other. In an example, the ratio of the depth of a polygonal cell to the thickness of its surrounding bars may be in the range of from 1 to 20, or from 1 to 15, or from 1 to 10, or from 2 to 20, or from 2 to 15, or from 2 to 10, or from 3 to 20, or from 3 to 15, or from 3 to 10.

The bars may have a depth dimension that is substantially perpendicular to the plane of the face each bar extends from. Thus, as the face of the polygonal cell arrangement or the fluid flow area is curved, bars at different concentric parameters may have depths that do not extend parallel to each other. This can be put differently. Taking a plane as the plane of the face of the polygonal cell arrangement at the concentric axis, a depth dimension that is perpendicular to this plane is referenced as 0 degrees. The depth at the concentric axis may therefore be 0 degrees. The depth of each concentric perimeter may be perpendicular to the plane of the face of the polygonal cell arrangement at the concentric axis. Alternatively, the depth of the nth perimeter of the polygonal cell arrangement may be offset from the perpendicular, while the depth of the (n−1)th perimeter, . . . , to the first perimeter may be sequentially more and more offset. For example, the depth of the fourth perimeter of the polygonal cell arrangement closest to the concentric axis may be angled from the perpendicular by 5 degrees, the depth of the third perimeter may be angled from the perpendicular by 10 degrees, the depth of the second perimeter may be angled from the perpendicular by 15 degrees and the depth of the first perimeter may be angled from the perpendicular by 20 degrees. The depth of each of the first, second, . . . , to nth perimeter may therefore be perpendicular or angled from the perpendicular of the plane of the face of the polygonal cell arrangement at the concentric axis. The depth of each of the first, second, . . . , to nth perimeter may be angled in the range of anywhere from 0 to 45 degrees. Where the flow grid comprises the nozzle, the nozzle may be arranged to share the concentric axis with the polygonal cell arrangement, and the depth of each of the first, second, . . . , to nth perimeter may be angled at an angle in the range of from 0 to 45 degrees. Thus, each polygonal cell may have a depth that is angled such that the flow of fluid into the polygonal cell arrangement or the fluid flow area is directed towards a concentric axis that is common to the polygonal cell arrangement and the inlet nozzle of the fluid flow generating device. Advantageously, the angled depth may create a channel to guide the inflow of fluid into the inlet nozzle of the fluid flow generating device.

In preferred embodiments, the flow grid also comprises the inlet nozzle. In such embodiments, the first type of cell geometry extends between the first perimeter and the second perimeter, that is, the polygonal cell arrangement is arranged within the first perimeter. In terms of producing such flow grid, it may be advantageous to produce the inlet nozzle and the polygonal cell arrangement with same or similar dimensions for ease of production. Thus, where the polygonal cell arrangement is arranged within a first perimeter having a first diameter, the first diameter may be sized to be complementary to the diameter of the nozzle.

Figure 4:
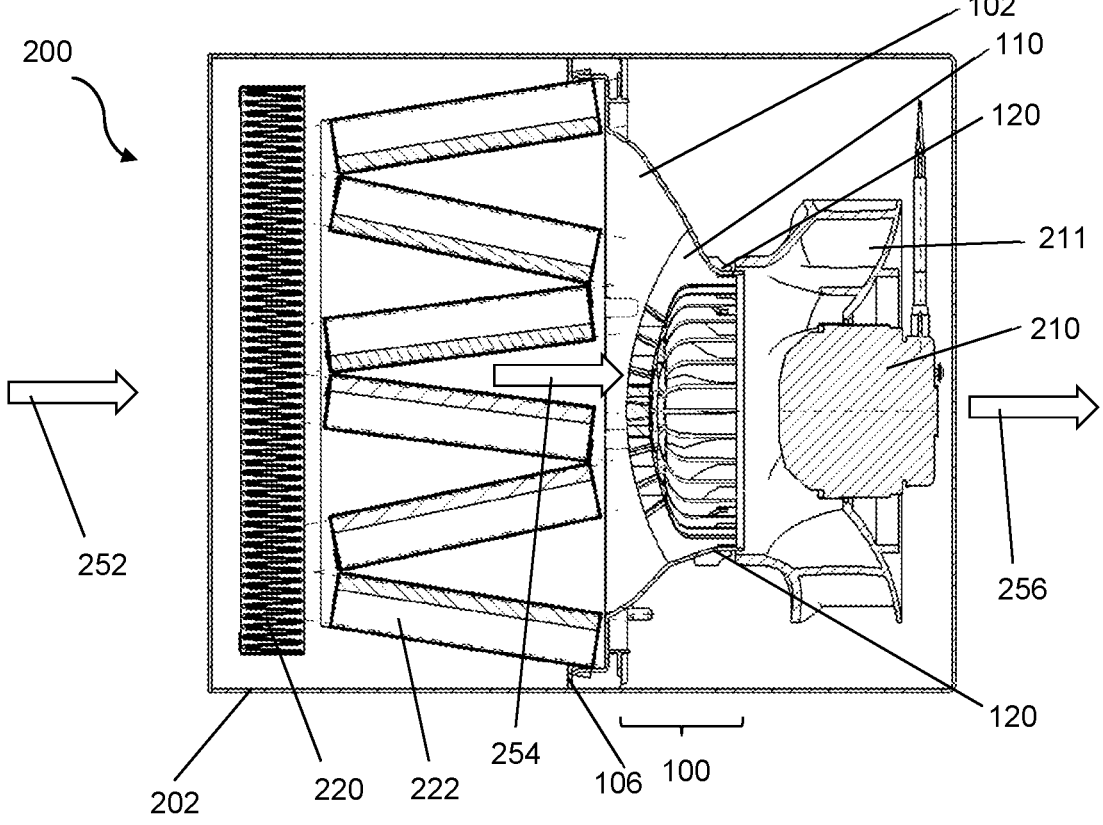
FIG. 4 shows an illustration of a side view of an ambient air purification device 200 according to an embodiment of the present disclosure.

FIGS. 1 and 2 show illustrations of a perspective view and a side view, respectively, of flow grid 100 according to an embodiment of the present disclosure. Flow grid 100 comprises frame 102. Frame 102 is a fluid inlet duct to channel the inflow of fluid into the fluid flow area 110 and towards a fluid flow generating device (not shown). The fluid inlet duct is curved to guide fluid flow into the fluid flow area 110. Frame 102 has lugs 104 that couple with corresponding slots (not shown) of a housing of a fluid flow generating device to secure the frame 102 onto the housing. Frame 102 also has a border shoulder 106 which couple to a corresponding pocket in the housing for additional engagement. Fluid flow area 110 is connected to the frame at the outer perimeter 114 of the fluid flow area 110. The fluid flow area 110 comprises a polygonal cell arrangement 112 arranged within a first perimeter 115. FIG. 2 shows nozzle 120 which extends from the frame 102 towards the fluid flow generating device. The nozzle 120 is sized to correspond to the fluid flow generating device. A more detailed illustration of nozzle 120 is shown in FIG. 4.

FIGS. 3a to 3c show illustrations of a top view, a perspective view and a side view, respectively, of fluid flow area 110 according to an embodiment of the present disclosure. The face of the fluid flow area 110 is shown in FIG. 3a. The fluid flow area 110 comprises an outer perimeter 114 having an outer diameter ($d_{outer}$) referred to as 114d, a first perimeter 115 having a first diameter 115d, a second perimeter 116 having a second diameter 116d and a third perimeter 117 having a third diameter 117d. The polygonal cell arrangement 112 is arranged within the first perimeter 115. The polygonal cell arrangement 112 comprises three types of cell geometries sharing a concentric axis 118. The first type of cell geometry extends between the first perimeter 115 and the second perimeter 116. The second type of cell geometry extends between the second perimeter 116 and third perimeter 117. The third type of cell geometry extends between the third perimeter 117 and the shared concentric axis 118. The first, second and third types of cell geometries are arranged concentrically to each other, such that the polygonal cell arrangement 112 has a kaleidoscopic pattern in which the three types of cell geometries are symmetrical along any mirror line intersecting the concentric axis 118. Between the outer perimeter 114 and the first perimeter 115 are bars that connect the polygonal cell arrangement 112 to the frame 102. The fluid flow area 110 is therefore made up of cells or through-holes or channels that allow fluid to pass therethrough.

As better seen in FIGS. 3b and 3c, the fluid flow area 110 including the polygonal cell arrangement 112 is convex, with the inflexion point of the convex curve at the concentric axis 118. The inflexion point points towards or is adjacent to the fluid intake side of the flow grid 100.

The frame 102, fluid flow area 110 and nozzle 120 are injection molded as one integrated piece. The piece is made of bars of the same injection-molded material. The bars have a depth 119d and a width 119w. Width 119w is typically 2 mm, while depth 119d may range anywhere from 1 time of 119w to 20 times of 119w.

As can be seen from FIG. 3a, the depth of bars forming the first, second and third perimeters 115, 116, 117 are angled such that the inflow of fluid through the fluid flow area 110 is directed towards the shared concentric axis 118. The depths of the first perimeter 115, second perimeter 116 and third perimeter 117 are respectively angled at sequentially smaller angles, so that the respective depths meet at a point along the axis 118. The depths of the bars forming the first, second and third perimeters 115, 116, 117 may be angled or offset from concentric axis 118, or, in other words, the perpendicular of the plane of the face of the polygonal cell arrangement 112 at the concentric axis 118. The depths of the bars extending between each perimeter may not be angled, that is, the depths of such bars may extend perpendicularly from the plane of the face they extend from. Thus, the depths of the bars forming the polygonal cell arrangement 112 may be angled in the range of anywhere from 0 to 45 degrees.

As can be seen in detail from FIG. 3c, the bars may extend further such that the fluid flow area 110 fits within the nozzle 120. The whole nozzle 120 is shown in FIG. 4. The nozzle 120 is sized such that the blades 211 of the fan 210 rotate around nozzle 120. Nozzle 120 has a diameter 120d, as shown in FIG. 2.

The allowable convexity of the fluid flow area 110 is dependent on the diameter of the nozzle 120d. The allowable convexity is measured by the ratio of the diameter of the nozzle 120d to the axial distance c, which is between the tip of the inflexion point of the fluid flow area 110 and the base of the fluid flow area 110.

FIG. 4 shows an illustration of a side view of an ambient air purification device 200 according to an embodiment of the present disclosure. The ambient air purification device 200 comprises a housing 202 which has at least one air inlet (not shown) to draw air from the surroundings into the housing and at least one air outlet (not shown) to release purified air back into the surroundings. The device 200 comprises a radial fan 210 having blades 211 housed in the housing 202, which takes in air at a fluid intake side and expels air at a fluid output side. At the fluid intake side of the fan 210, flow grid 100 is arranged, which comprises frame 102, fluid flow area 110 and nozzle 120. Frame 102 is mounted to the housing 202 via border shoulder 106, which couples to a corresponding pocket (not shown) in the housing 202.

The device 200 further comprises at least one filter element. Here, device 200 comprises two filter elements 220, 222. The filter elements 220, 222 are arranged at a fluid intake side of the flow grid to protect the fan 210 from particles in the air taken in from the surroundings. At least one of the filter elements may be arranged after the fan 210 to further filter any remaining particles before release of the purified air back into the surroundings.

The at least one filter element can be classic filter elements made of porous filter media permeable to air and/or electrostatic precipitators. One filter element may be used if quality requirements can be met. Otherwise, more than one filter element may be used. For example, two filter elements may be used, where a main filter element is used with an upstream pre-filter element. The pre-filter element has a coarser porosity than the main filter element and serves to protect the main filter element from coarser particles, thereby extending the service life of the main filter element. Where one filter element is used, the filter element may comprise a non-HEPA particulate filter medium.

At least one of the filter elements may comprise at least one particulate filter medium, preferably a HEPA filter medium, and/or comprise at least one adsorbent, in particular an activated carbon and/or a zeolite. The filter element(s) may be non-pleated, such as a filter mat, or pleated. The adsorbent may serve to adsorb predetermined noxious gases, such as $NO_x$, CO, $NH_3$, and/or odors. The adsorbent may be part of the filter medium and may be present as a bed in the form of one or more layer(s) therein. The filter medium of at least one of the filter elements may comprise at least one further layer configured as an antimicrobial and/or anti-allergenic layer comprising at least one antimicrobial and/or anti-allergenic substance. The antimicrobial, in particular antibacterial or biocidal or antiviral or antifungal, substance enables the destruction of microbes in the air or on or in the filter medium or parts or layers thereof. The anti-allergenic substance can, for example, make the finest pollen particles and other allergens, which cannot always be completely retained by the filter medium, at least partially harmless to the human body or its immune system.

The main filter element may comprise the HEPA filter medium. The HEPA filter medium may comprise at least one membrane layer made of an expanded PTFE. The HEPA filter medium may be certified according to ISO 29463 and EN 1822 and meets the requirements of class H13 or H14.

Alternatively, the main filter element may comprise a V-cell filter, which are flat filter media arranged in a V-configuration to one another in order to maximize filter area. The V-cell filter may comprise a HEPA or non-HEPA filter medium.

The pre-filter element may comprise a filter medium that filters coarser particulate matter. The particulate filter medium may comprise a spunbonded material, in particular a polyethylene terephthalate or polypropylene spunbonded material, and/or a needlebonded material, in particular a polypropylene or polyethylene terephthalate needlebonded material, and/or a meltblown layer and/or a multicomponent fiber material, in particular comprising bicomponent fibers with a polypropylene/polyacrylonitrile component. In an example, the pre-filter element may also comprise the adsorbent as disclosed herein.

In FIG. 4, filter element 220 is shown as a pleated pre-filter, while filter element 222 is shown as a V-cell filter. An air flow generated by the fan 210 enters from the air inlet(s) in the direction of block arrow 252 and goes through the filter elements 220, 222. The filtered air flow then exits filter elements 220, 222 and enters the flow grid 100 in the direction of block arrow 254. The streamlined air flow then exits nozzle 120 and enters the fan 210, which releases the purified air via the air outlet(s) and back into the surroundings in the direction of block arrow 256.

The disclosed flow grid 100 is capable of increasing the volumetric flow into the fan 210 as compared to prior art protection grids. The disclosed flow grid 100 is capable of reducing the decibels emitted by the ambient air purification device 200 at the fluid intake side as compared to the prior art protection grids.

The invention claimed is:

1. A flow grid arranged at a fluid intake side of a fluid flow generating device, the flow grid comprising:

a frame configured to be mounted to a housing of the fluid flow generating device; and a fluid flow area connected to the frame, the fluid flow area having an outer perimeter, the outer perimeter having a diameter (douter), the outer perimeter being adjacent to the frame, wherein the fluid flow area comprises a polygonal cell arrangement having a kaleidoscopic pattern, wherein the polygonal cell arrangement comprises at least two types of cell geometries sharing a concentric axis, each type of cell geometry being arranged concentrically to the other(s), and wherein the polygonal cell arrangement is convex when viewed from the fluid intake side.

2. The flow grid of claim 1, further comprising a nozzle extending from the frame and towards the fluid flow generating device, the nozzle being sized to correspond to the fluid flow generating device.

3. The flow grid of claim 2, wherein the polygonal cell arrangement is arranged within the outer perimeter, wherein the fluid flow area comprises a second perimeter having a second diameter smaller than the diameter (douter) of the outer perimeter, and wherein a first type of cell geometry of the at least two types of cell geometries extends between the outer perimeter and the second perimeter.

4. The flow grid of claim 1, wherein the fluid flow area comprises a first perimeter having a first diameter smaller than the diameter (douter) of the outer perimeter and a second perimeter having a second diameter smaller than the first diameter, the polygonal cell arrangement being arranged within the first perimeter, and wherein a first type of cell geometry of the at least two types of cell geometries extends between the first perimeter and the second perimeter.

5. The flow grid of claim 4, further comprising:

a nozzle extending from the frame and towards the fluid flow generating device, the nozzle being sized to correspond to the fluid flow generating device, and wherein the first diameter of the first perimeter is sized to be complementary to the diameter of the nozzle.

6. The flow grid of claim 3, wherein the fluid flow area comprises a third perimeter, a fourth perimeter, . . . , and an nth perimeter, each of the third perimeter, the fourth perimeter, . . . , and the nth perimeter having a diameter sequentially smaller than the previous perimeter, and wherein the at least two types of cell geometries include:

a second type of cell geometry, a third type of cell geometry, and an nth type of cell geometry, wherein the second type of cell geometry extends between the second perimeter and the third perimeter, the third type of cell geometry extends between the third perimeter and the fourth perimeter, . . . , and the nth type of cell geometry extends between the nth perimeter and the shared concentric axis.

7. The flow grid of claim 1, wherein the fluid flow area is convex when viewed from the fluid intake side.

8. The flow grid of claim 2, wherein an allowable convexity, which is measured by a ratio of a diameter of the nozzle to an axial distance between a tip of an inflexion point of a convex curve and the outer perimeter of the fluid flow area, is at least 1.5, the inflexion point of the convex curve sharing the concentric axis with the outer perimeter of the fluid flow area.

9. The flow grid of claim 1, wherein the frame comprises a fluid inlet duct configured to channel an inflow of fluid into the fluid flow area and towards the fluid flow generating device, or wherein the frame is configured to be mounted to the fluid inlet duct of the housing of the fluid flow generating device.

10. The flow grid of claim 2, wherein the frame, the fluid flow area, the nozzle and a fluid inlet duct of the frame are integrally formed.

11. The flow grid of claim 1, wherein the fluid flow area comprises bars forming the polygonal cell arrangement, the bars having a depth, and wherein a ratio of the depth of a polygonal cell to a thickness of surrounding bars is in a range of from 1 mm to 20 mm.

12. The flow grid of claim 1, wherein each polygonal cell of the polygonal cell arrangement has a diameter in a range of from 6 mm to 25 mm.

13. The flow grid of claim 6, wherein the nozzle is arranged to share the concentric axis, and wherein a depth of each of the first perimeter, second perimeter, . . . , to nth perimeter is angled at an angle in a range of from 0 degrees to 45 degrees.

14. An ambient air purification device comprising:

a housing having at least one air inlet and at least one air outlet;

a fluid flow generating device housed in the housing;

the flow grid as claimed in claim 1, arranged at the fluid intake side of the fluid flow generating device, wherein the frame of the flow grid is mounted to the housing; and at least one filter element arranged at a fluid intake side of the flow grid, such that an air flow generated by the fluid flow generating device enters from the air inlet(s), goes through the filter element, the flow grid and the fluid flow generating device in sequence, and exits via the air outlet(s).

15. A flow grid arranged at a fluid intake side of a fluid flow generating device, the flow grid comprising:

a frame configured to be mounted to the fluid flow generating device; and a fluid flow area connected to the frame, wherein the fluid flow area comprises a polygonal cell arrangement having a kaleidoscopic pattern, wherein the polygonal cell arrangement comprises at least two types of cell geometries sharing a concentric axis, each type of cell geometry being arranged concentrically to the other(s), and wherein the polygonal cell arrangement is convex when viewed from the fluid intake side of the fluid flow generating device.

16. An ambient air purification device comprising:

a housing having an air inlet and an air outlet;

a fluid flow generating device in the housing; and the flow grid as claimed in claim 15, wherein the frame of the flow grid is mounted to the housing; and at least one filter element arranged at a fluid intake side of the flow grid, wherein an air flow generated by the fluid flow generating device enters from the air inlet of the housing and goes through the filter element, the flow grid and the fluid flow generating device in sequence and exits through the air outlet.

* * * * *